United States Patent
Bailey et al.

(10) Patent No.: US 6,463,548 B1
(45) Date of Patent: Oct. 8, 2002

(54) METHOD AND APPARATUS TO ENFORCE CLOCKED CIRCUIT FUNCTIONALITY AT REDUCED FREQUENCY WITHOUT LIMITING PEAK PERFORMANCE

(75) Inventors: Daniel W. Bailey, Northborough; Jeffrey D. Pickholtz, Marlboro; Shane L. Bell, Shrewsbury, all of MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/309,070

(22) Filed: May 10, 1999

(51) Int. Cl.[7] .................................................. G06F 1/04
(52) U.S. Cl. ...................................... 713/503; 713/600
(58) Field of Search ................................ 713/400, 401, 713/500, 501, 503, 600

(56) References Cited

U.S. PATENT DOCUMENTS

| | | | |
|---|---|---|---|
| 4,910,713 A | | 3/1990 | Madden et al. ............. 365/189 |
| 5,023,480 A | | 6/1991 | Gieseke et al. ............. 307/448 |
| 5,719,862 A | * | 2/1998 | Lee et al. ..................... 370/355 |
| 5,742,840 A | * | 4/1998 | Hansen et al. .............. 712/210 |
| 5,935,257 A | * | 8/1999 | Nishimura ................... 713/503 |
| 6,078,623 A | * | 6/2000 | Isobe et al. .................. 375/259 |

OTHER PUBLICATIONS

Jiang, June et al., "High–Performance, Low–Power Design Techniques for Dynamic to Static Logic Interface," Proceedings 1997 International Symposium on Low Power Electronics and Design, Monterey, CA, Aug. 18–20, 1997, pp. 12–17.

* cited by examiner

*Primary Examiner*—Dennis M. Butler
(74) *Attorney, Agent, or Firm*—Hamilton, Brook, Smith & Reynolds, P.C.

(57) ABSTRACT

A method and apparatus are provided for ensuring that a clocked circuit will function after fabrication, regardless of the presence of clock skew. More particularly, a method and apparatus are shown for de-skewing the clock signals of such a clocked circuit only when clock skew is present. When such clock skew does not develop, peak performance of the associated circuit can be achieved by turning off the de-skewing function without removing that functionality from the circuit.

32 Claims, 13 Drawing Sheets

METHOD AND APPARATUS TO ENFORCE CLOCKED CIRCUIT FUNCTIONALITY AT REDUCED FREQUENCY WITHOUT LIMITING PEAK PERFORMANCE

BACKGROUND OF THE INVENTION

Generally speaking, computer systems typically include one or more central processor units (CPUs). Each CPU includes many signal paths that convey data between functional units or logic circuits that operate on that data. Such data is typically conveyed using a clocked circuit that operates in conjunction with a specified data transfer timing structure. That timing structure dictates a time period when the data to be transferred is valid. Accordingly, the data must be captured while it is valid to ensure functionality of the associated CPU. Such time periods when data is valid are typically identified by particular assertions of system clock signals.

When data is to be transferred from one logic circuit to another, the clock signal that clocks the sending or driver unit is typically distinct from the clock signal that clocks the receiving unit. Although both clock signals assert at essentially the same frequency, significant differences may occur between assertion times based primarily on the fact that they are generated by different clocking circuits. Even when those clocking circuits are substantially similar, differences can arise based upon resistance, capacitance or inductance differences, or based upon resistance, capacitance and inductance differences, or based upon temperature, voltage, or process variances. The difference between the assertion times of the two clock signals is referred to as "clock skew".

In the case of such data transfers, it is desired that data is transferred as quickly as possible such that peak performance may be achieved. Accordingly, data is typically transferred in a single clock period, or clock phase, wherein the driver unit generates the data in response to a first clock assertion (or edge) and the receiving unit latches the data on the next clock assertion (or edge). Such a data transfer strategy can remain operable in the presence of clock skew if that clock skew causes the clock signal coupled to the receiver unit (the receiving clock) to assert before the clock signal coupled to the driver circuit (the driving clock). In that case, the data output by the driver circuit has not yet begun to change and therefore the receiver unit latches valid data.

However, the above-mentioned data transfer methodology can be frustrated when clock skew causes the receiving clock signal to assert after the driving clock signal. Such a data transfer will typically fail because it is possible for the receiver circuit to latch the data after it has become indeterminate. Such an effect is referred to as a "race-through" condition since it causes a race between the data becoming indeterminate and the receiver circuit attempting to latch valid data. Accordingly, the data that is latched depends upon the speed at which the data is changing and therefore cannot be relied upon for robust data transfer operations.

When a clocked circuit contains a race-through condition, data transfers will typically not be able to complete regardless of the frequency at which the circuit is operated. Accordingly, when a race-through condition occurs within a clocked circuit of a semiconductor device, even basic functionality of that device cannot be exercised. Typically, the clocking strategy of a semiconductor device is heavily simulated before device fabrication is initiated in an attempt to avoid the above-mentioned problems. However, regardless of the amount of simulation, process and environmental variances can still cause the clock skewing to cause a race-through problem.

Prior art approaches for eliminating the effects caused by clock skew, referred to as a de-skewing operation, have proved problematic. For example, one method for de-skewing the clock signals involves preventing newly generated data from being presented to the receiver device until the previously generated data has been latched. In other words, new data that is generated by the driver device is delayed or gated until the receiving clock signal has asserted. Such an approach eliminates the effects caused by clock skew at the expense of significantly extended data transfer times. In other words, the data transfer is delayed by at least the time difference between the assertions of the two clock signals, i.e., by the duration of the clock skew.

SUMMARY OF THE INVENTION

The prior art de-skewing circuits do not provide a temporary solution but rather become a permanent part of the clocked circuit. The solution becomes permanent because it is difficult to predict whether a given circuit modification, designed to prevent such clock skew, will be effective in the presence of different environmental variations. Accordingly, because it cannot accurately be determined whether the clock skew has, in fact, been corrected, peak performance of the circuit is thereafter limited by the speed of the de-skewing circuit.

Generally a method is provided for ensuring that a clocked circuit will function after fabrication, regardless of the presence of clock skew. More particularly, a method and apparatus are shown for de-skewing the clock signals of such a clocked circuit only when excessive clock skew is present. When such clock skew does not develop, peak performance of the associated circuit can be achieved by turning off the de-skewing function without removing the functionality from the circuit.

With a preferred embodiment of the invention an apparatus is provided for ensuring functionality of a clocked circuit without limiting its peak performance. The apparatus includes a de-skewing device that receives a data signal to be transferred to a receiver device. That data signal is generated by a driver device at a time that is indicated by an assertion of a driving clock signal. The de-skewing device simply buffers the data signal with minimal delay when a mode select signal is de-asserted, indicating the absence of a clock skew problem. The de-skewing device alternatively gates the data signal until a receiving clock signal is asserted to ensure that the receiver device latches valid data.

The driving clock signal and the receiving clock signal may be generated by different clock circuits. When different clock circuits are employed, differences can arise between the assertions of the clock signals. Those differences are referred to as clock skew.

With a further aspect of a preferred embodiment, the driver device and the receiver device can be implemented using edge triggered sense amplifiers.

The clocked circuit can further include a logical-or circuit for performing a logical-or function between the receiving clock signal and the de-skew mode signal such that the de-skew device will perform the buffer operation when the mode select signal is de-asserted. When the mode select signal is de-asserted, the clocked circuit can operate at peak performance. Alternatively, the de-skewing device will perform the de-skewing operation when the mode select signal is asserted.

Because the mode select signal can be selectively asserted or de-asserted, the de-skewing device and the logical-or circuit may remain coupled to the clocked circuit even in a production version of that clocked circuit without limiting its peak performance.

With a still further aspect of an embodiment of the present invention, a logic function is performed on the data signal output from the de-skewing device before it is conveyed to the receiver device.

Accordingly, a semiconductor device that includes such a selectable de-skewing device is ensured to be functional regardless of the presence of clock skew.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Generally, the present invention ensures that a clocked circuit will remain functional after fabrication regardless of the presence of clock skew. Further, the present invention allows a de-skewing circuit to be turned off in the event that clock skew does not arise in the fabricated circuit, such that the peak performance of that circuit is not hampered or limited by the de-skewing function.

I. A Computer System

Figure 1:
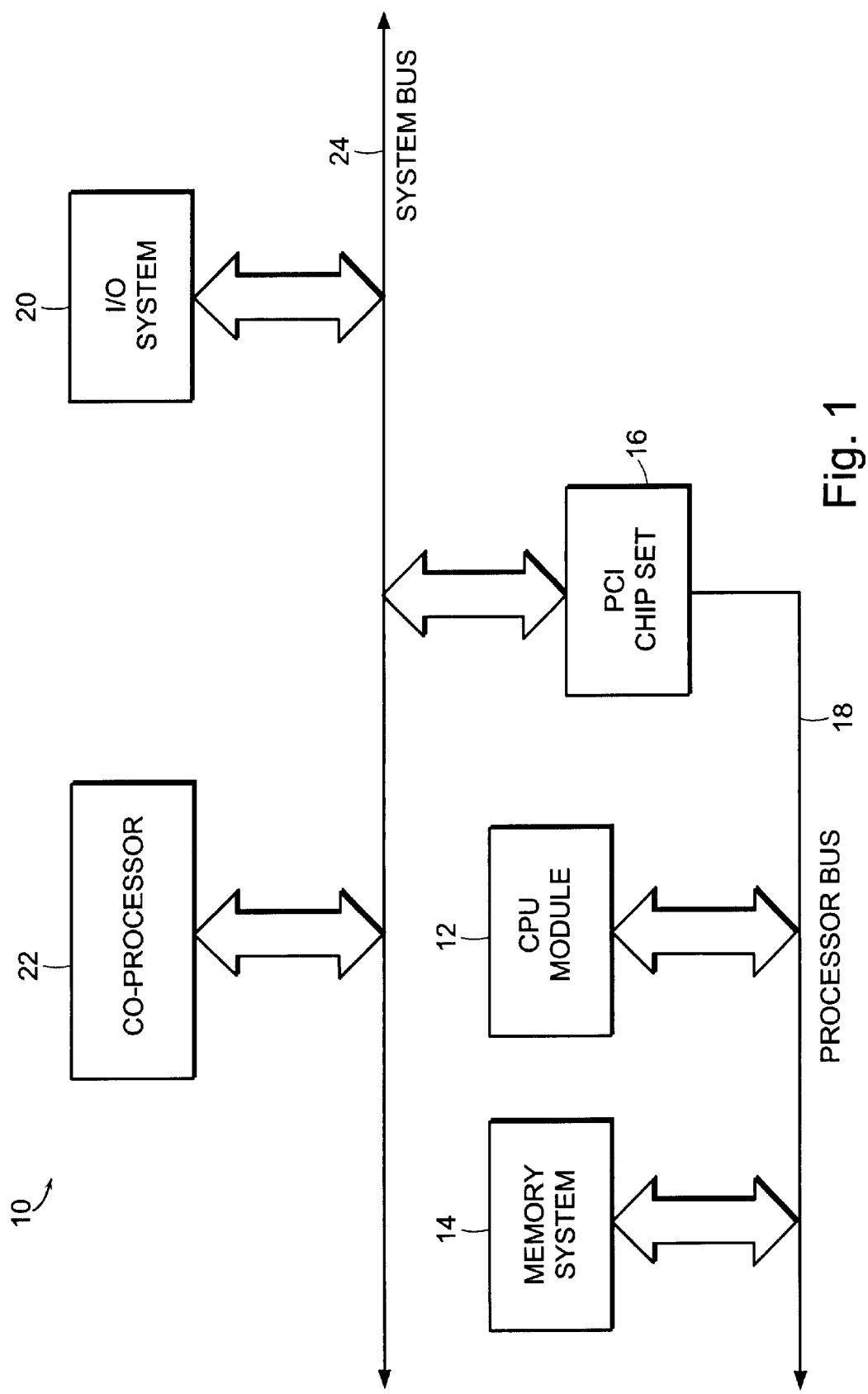
FIG. 1 is a schematic drawing of a computer system including a central processing module in which the present invention can be used.

FIG. 1 is a schematic diagram of a computer system 10 that includes a central processing unit (CPU) module 12, a memory system 14 and a PCI chip set 16 connected by a processor bus 18. The PCI chip set 16 is further connected to an I/O system 20 and a co-processor module 22 by a system bus 24. Central processing module 12 can include a number of sense amplifiers according to the present invention.

Figure 2:
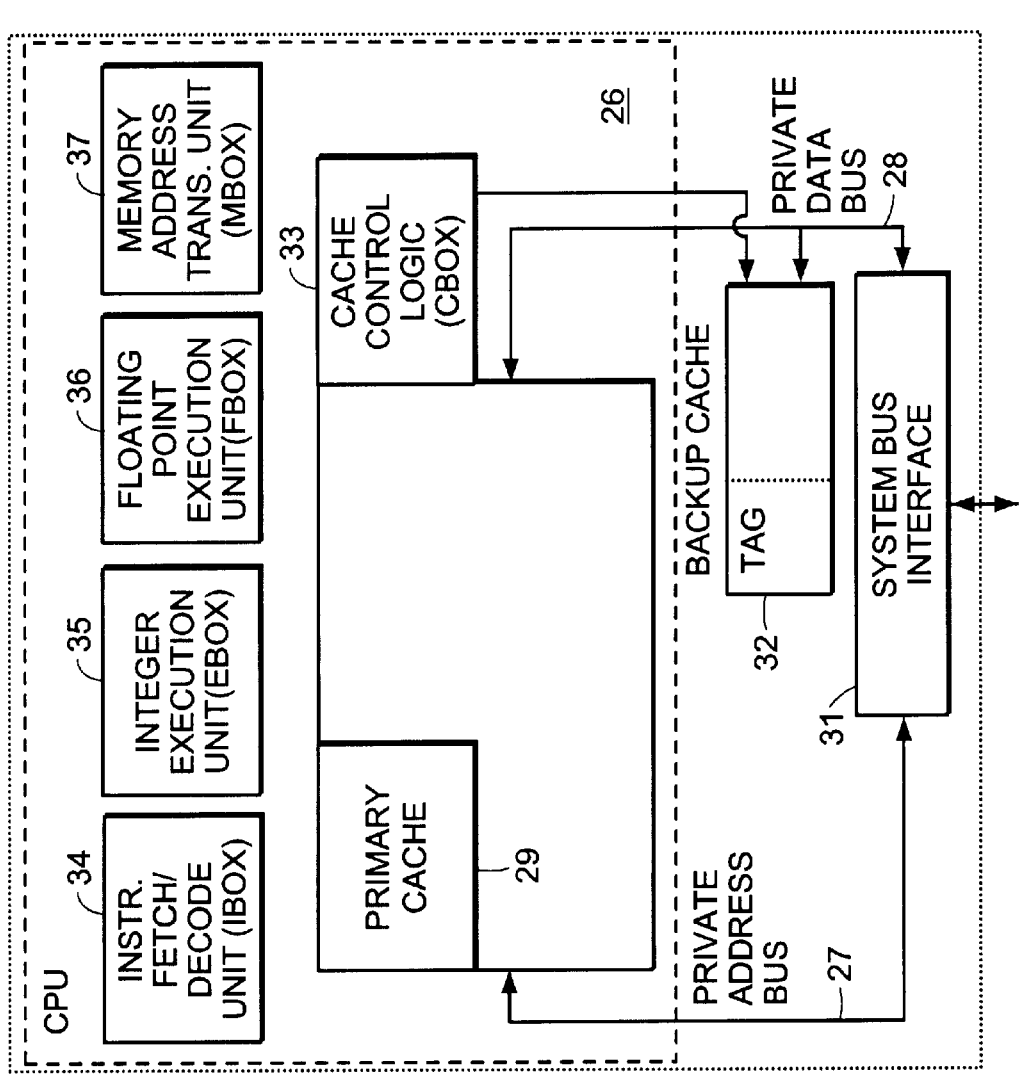
FIG. 2 is a schematic diagram of the central processing module of FIG. 1.

Referring now to FIG. 2, central processing module 12 is shown to include a CPU 26. A private address bus 27 and a private data bus 28 within CPU 26 connects a primary cache 29 and a system bus interface 31. The private data bus 28 connects the CPU 26 to a backup cache (Bcache) 32 that, along with the primary cache 29, is controlled by the Cache Control and Bus Interface unit 33.

CPU 26 further includes several logic circuits that enable it to perform the major operations that the computer system 10 requires. The Ibox 34, or Instruction Fetch and Decode Unit, controls instruction prefetching, instruction decoding, branch prediction, instruction issuance, and interrupt handling. The Ebox 35, or Integer Execution Unit, handles the functions of addition, shifting, byte manipulation, logic operations, and multiplication for integer values stored in the system. These same operations, for floating point values, are controlled by the Fbox 36, or Floating Point Execution Unit. The Mbox 37, or Memory Address Translation Unit, translates virtual addresses, generated by programs running on the system, into physical addresses which are used to access locations in the computer system. Lastly, the Cbox 33, or Cache Control and Bus Interface Unit, controls the primary cache 29 and backup cache 32. It also controls the private data bus 28, private address bus 27, memory related external interface functions, and all accesses initiated by the Mbox 37.

Each of the circuits mentioned above include clocked circuits for transferring data signals within and between functional units. Accordingly, clocked circuits are widely used in many different areas of CPU module 12. In order to increase the rate at which data signals can be transferred by those clocked circuits, while also ensuring functionality in the event that fabrication variations cause clock skew effects to arise, additional functionality must be implemented within those circuits.

II. An Inventive Clocked Circuit for Data Transfer

Figure 3:
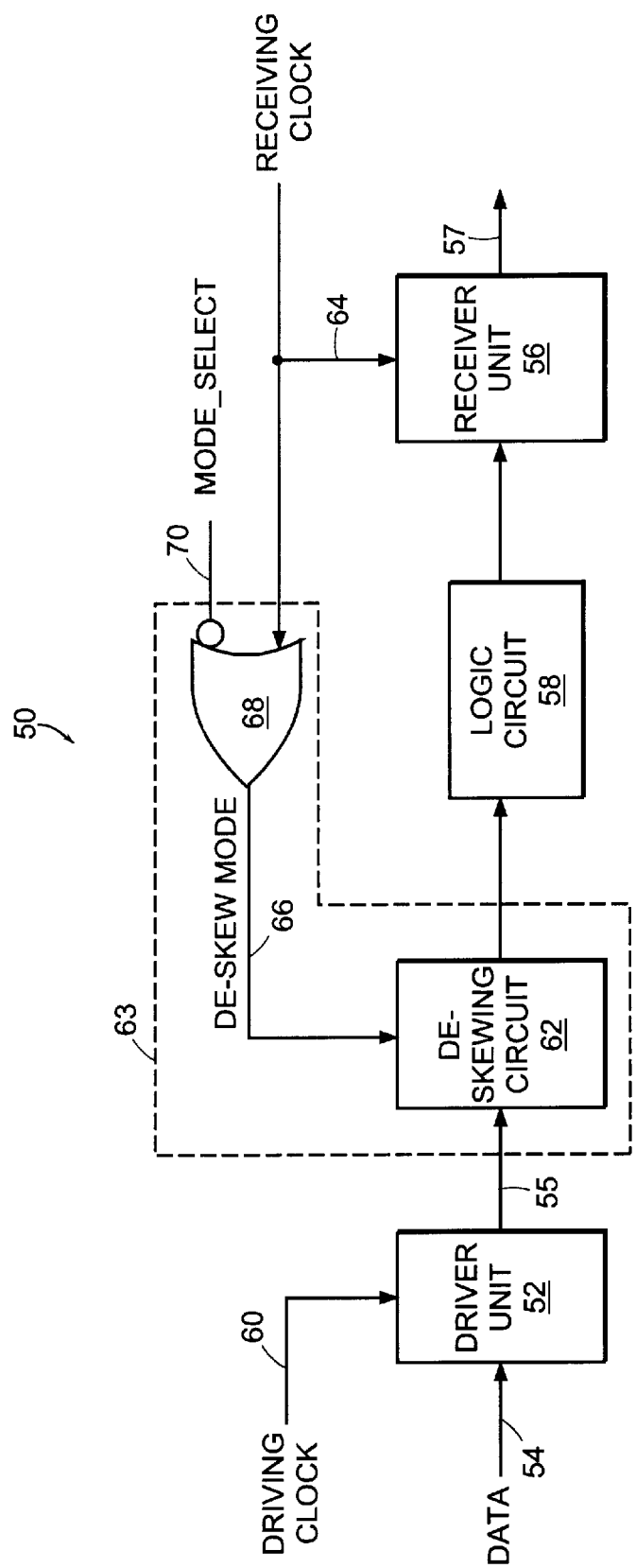
FIG. 3 is a functional schematic diagram of a clocked circuit that can be practiced in the central processing module of FIG. 2, according to the present invention.

Referring now to FIG. 3, a functional block diagram of clocked circuit 50 is shown to include a driver unit 52 that receives a data signal 54. Data signal 54 conveys data values that are intended to be transferred to receiving unit 56 after being operated upon by logic functions implemented in logic circuit 58. The data values conveyed on data signal 54 must be valid when driving clock signal 60 is asserted. Accordingly, driver unit 52 latches the data value on data signal 54 upon the assertion of driving clock signal 60.

Figure 4:
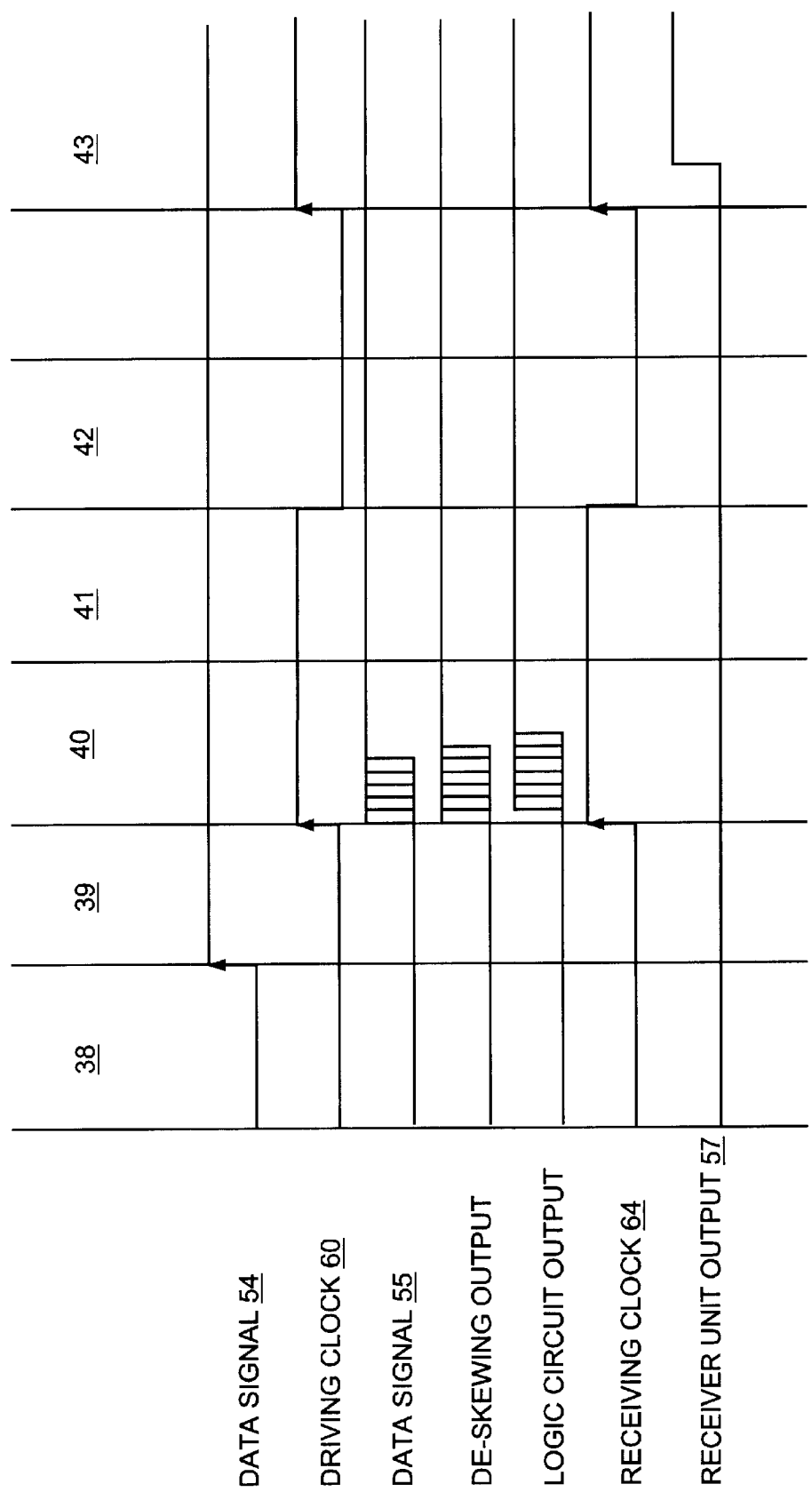
FIG. 4 is a timing diagram depicting a data transfer performed by the clocked circuit of FIG. 3.

Referring to the timing diagram of FIG. 4, the operation of clocked circuit 50 is shown in relation to a typical data transfer in the absence of clock skew. For illustration purposes, consider that mode-select signal 70 has previously been de-asserted causing de-skew mode signal 66 to assert. Accordingly, input data signal 54 and output data signal 57 are both at logic low levels during the time period 38. During time period 39, input data signal 54 rises to a logic high level. That logic high is intended to be conveyed to output data signal 57. Subsequently, driving clock signal 60 asserts during time period 40, causing driver unit 52 to latch the logic high level. At the same time, receiving clock signal 64 also asserts causing receiver unit 56 to latch the previously asserted logic low level.

After the time delay imposed by driver unit 52, the logic high level is output on data signal 55 and passed through De-skewing circuit 62 to logic circuit 58 during time period 40. Likewise, after a time delay imposed by logic circuit 58, the logic high level is passed to the input of receiver unit 56 during time period 42. The receiving clock 64 asserts in clock period 43 and latches the logic high level to the output data signal 57 of receiving unit 56.

It should be noted that a logic circuit delay after the input of logic circuit 58 begins to change, i.e. becomes indeterminate, the data output therefrom also becomes indeterminate. The data output from logic circuit 58 cannot be latched during such indeterminate period otherwise improper operation will result.

While the driving clock signal 60 and the receiving clock signal 64 typically assert at the same frequency, the times at which they are asserted can vary for many reasons including temperature, voltage and process variations. The variation between clock assertions, or clock skew, can cause the receiving clock 64 to assert after the driving clock signal 60 has asserted. When that situation arises, indeterminate data can be latched by the receiving unit. Specifically, when the driving clock signal 60 is asserted, new data is driven into logic circuit 58 causing it to change state. While a circuit is in the midst of changing state, the value that is output therefrom is in a state of flux and therefore is indeterminate. A period of time that is comprised of the output delay of the driver circuit and the propagation delay of the logic circuit must be greater than the period of time that comprises the data hold time of the receiver unit 56 and the time difference between the assertions of the driving clock 60 and the receiving clock 64. Accordingly, it is desirable that the driving clock signal 60 and the receiving clock signal 64 are asserted at the same time, or that the receiving clock signal is asserted slightly before the driving clock signal.

Therefore, circuits for de-skewing the driving clock signal and the receiving clock signal have been connected between the driver unit and the logic unit to guarantee that the output of driver unit 52, and hence the output of logic circuit 58, will not become indeterminate before receiver unit 56 latches the data. Such de-skewing circuits typically delay, or gate, data that is output from the driver unit 52 until after the receiving clock signal 64 has asserted. While such a solution guarantees that valid data will be latched by receiver unit 56, it also hampers peak performance of the data transfer by adding significant delay. Also, since it cannot reliably be determined that a solution to the underlying clock skew problem will work, and since the circuit can be rendered completely inoperable therefrom, such de-skewing circuits 62 typically become a permanent part of clocked circuit 50. Hence, data transfer performance is permanently hampered in order to ensure functionality.

According to the present invention, clocked circuit 50 further includes logic for guaranteeing that it will function in the presence of clock skew and for allowing it to achieve peak data transfer performance when that clock skew is not present. Therefore, a preferred embodiment of the present invention includes a selectable de-skewing circuit 63 that either gates the output of driver unit 52 until receiving clock signal 64 has asserted (de-skewing mode), or simply buffers the output of driver unit 52 before it is presented to logic circuit 58 (buffering mode).

De-skewing unit 62 is clocked by a de-skew mode signal 66. De-skew mode signal 66 is generated by imposing a logic function, such as a logical-or 68, on receiving clock signal 64 and the inversion of a mode_select signal 70. (It should be noted that other logic functions such as logical-and functions can also be used depending on the assertion and deassertion logic levels of the associated signals and the operation of those signals.) Generally, when mode_select signal 70 is asserted, the de-skewing mode is selected and de-skewing circuit 62 gates the output of driver circuit 52 with the assertion of receiving clock signal 64. When placed in the de-skewing mode, clocked circuit 50 is guaranteed to function in the presence of clock skew.

Alternatively, after the circuit has been tested and the clock skew is determined to be essentially non-existent, the buffering mode is selected by the de-assertion of mode_select signal 70. Accordingly, the data transfer between the driver unit 52 and the receiver unit 56 is not hampered and peak data transfer performance can be achieved. Some added delay is caused by the addition of a small amount of parasitic capacitance and added series transistors associated with de-skewing circuit 62.

Figure 5:
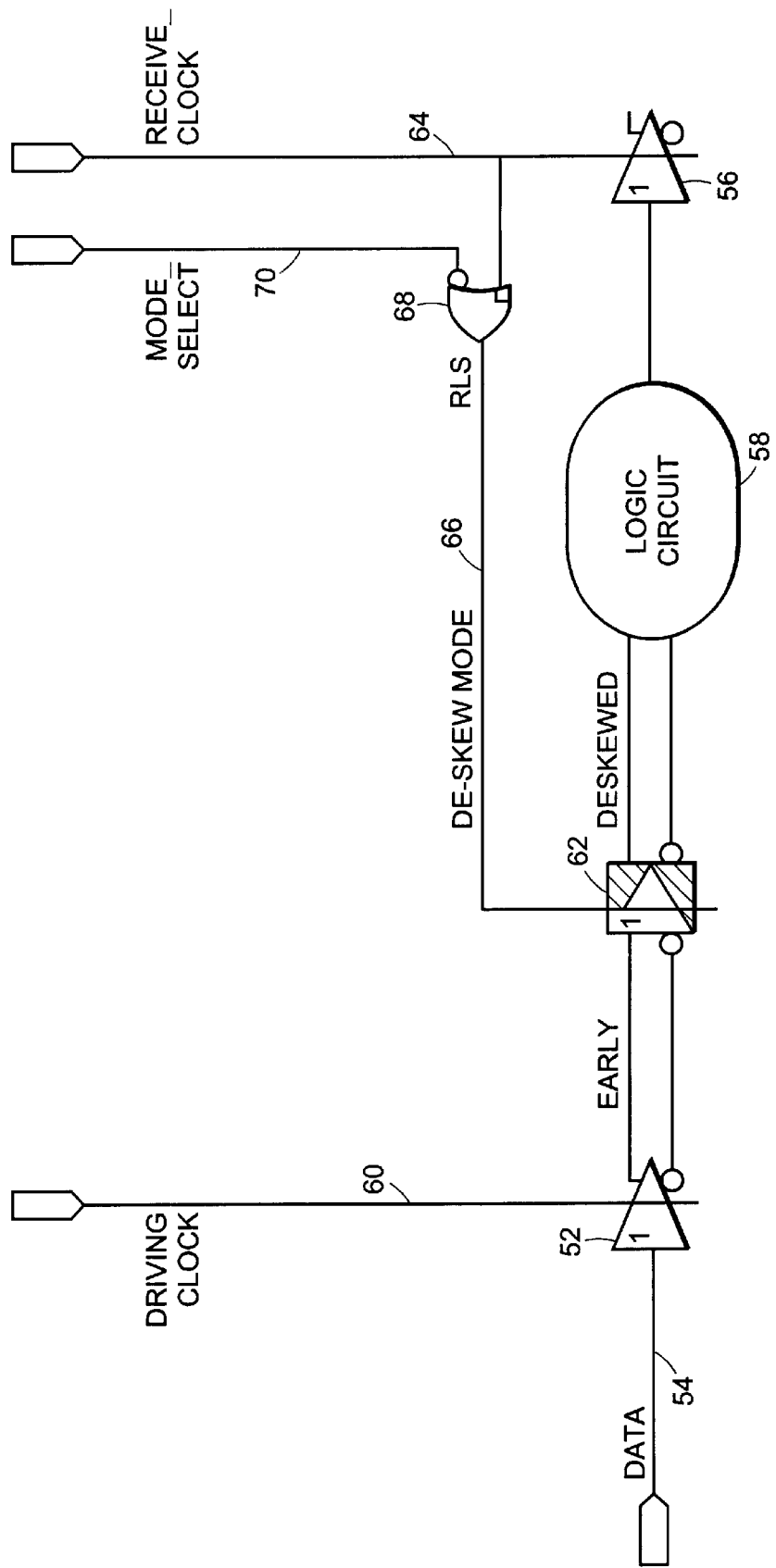
FIG. 5 is a gate level schematic diagram of an embodiment of the clocked circuit of FIG. 3, according to the present invention.

Referring now to FIG. 5, a gate level schematic diagram of an embodiment of clocked circuit 50 is shown wherein driver unit 52, de-skewing unit 62, and receiver unit 56 are implemented using sense amplifiers. The de-skewing unit 62 is selectable such that it can perform either a de-skewing operation or a buffering operation. The output of the de-skewing unit 62 is conveyed to logic circuit 58 and subsequently to sense amplifier receiver unit 56.

Figure 6:
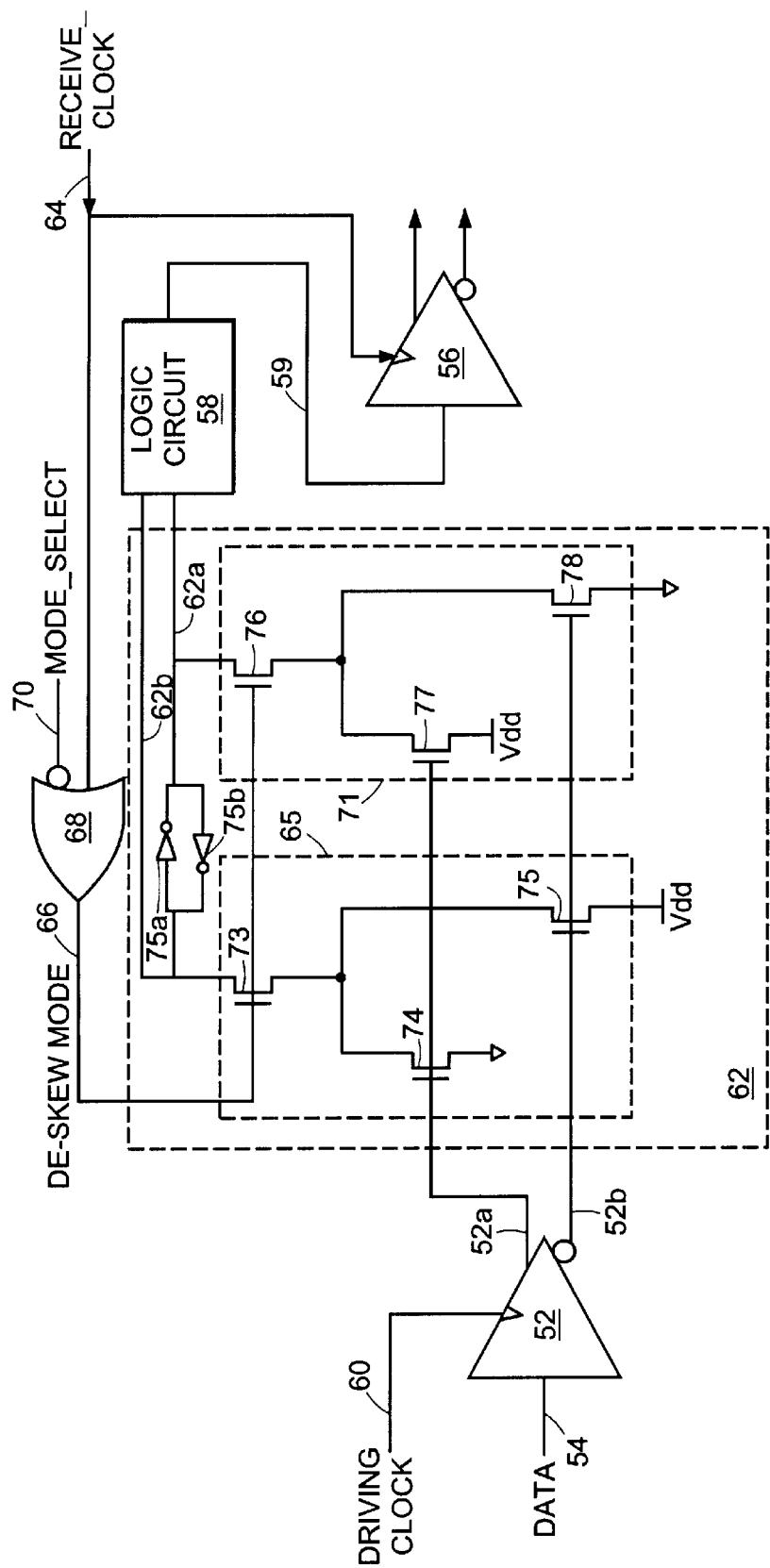
FIG. 6 is a transistor level schematic diagram of an embodiment of the clocked circuit of FIG. 3, according to the present invention.

Referring now to FIG. 6, a transistor level schematic diagram of de-skewing unit 62 is shown in relation to the elements of clocked circuit 50. Driver unit 52 is shown to be a sense amplifier that receives data signal 54. Sense amplifier 52 latches the data conveyed on data signal 54 upon the assertion of driving clock signal 60. Responsively, sense amplifier 52 outputs true and a complementary versions (52a and 52b) of that data. Sense amplifier de-skewing unit 62 is shown to include a pair of transistor stacks (71 and 65) for generating the true and complement output signals 62a and 62b. The first transistor stack 65 includes transistors 73, 74 and 75 and the second transistor stack 71 includes transistors 76, 77 and 78. Each stack is enabled upon the assertion of the de-skew mode signal 66 and either pulls-up or pulls-down the associated output signal 62b or 62a, in response to the logic levels at the outputs of driver unit 52.

III. Operation of the Clocked Circuit in the Presence of Clock Skew

Figure 7:
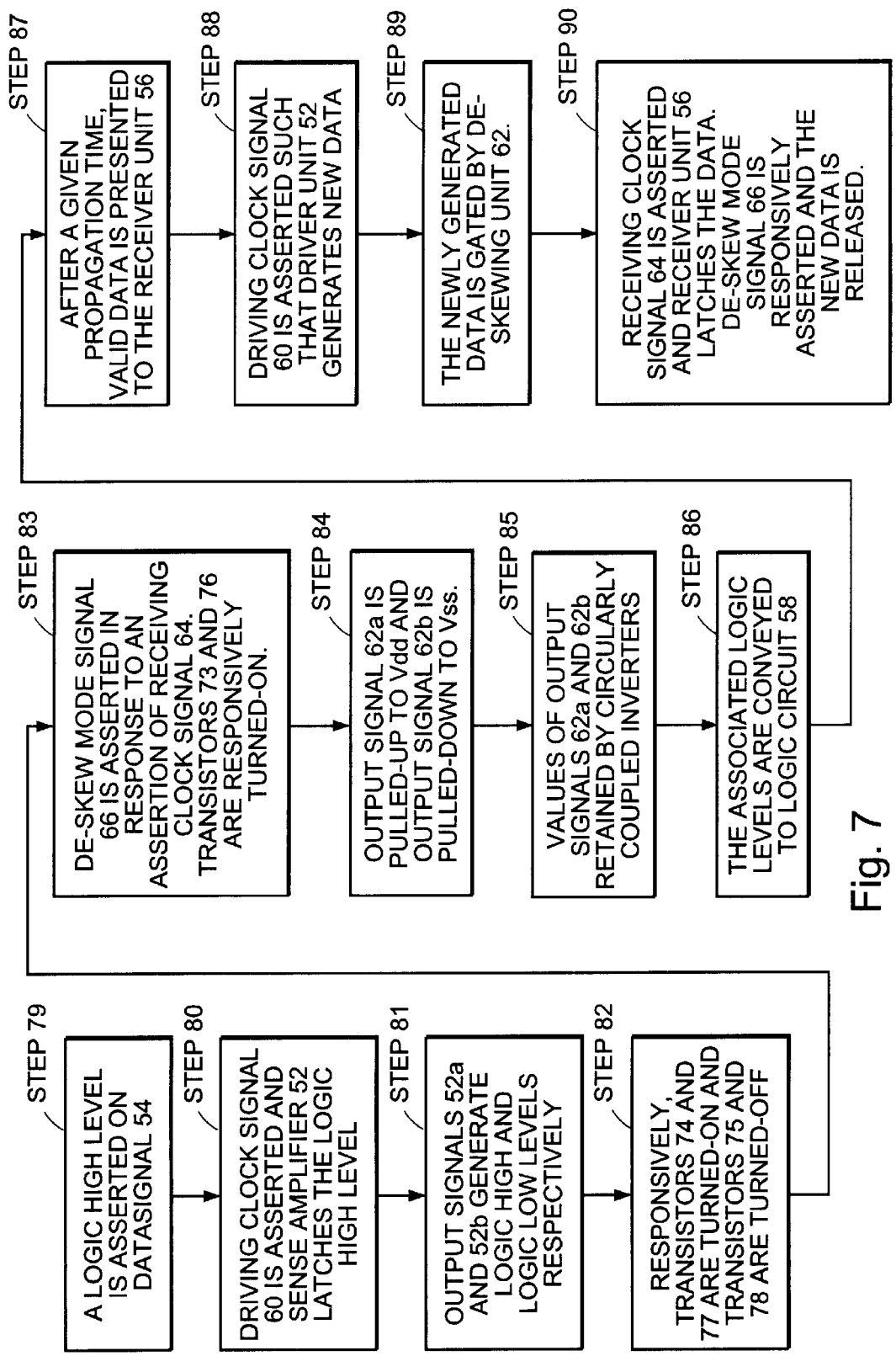
FIG. 7 is a flow diagram of the operation of the clocked circuit of FIG. 6.
Figure 8:
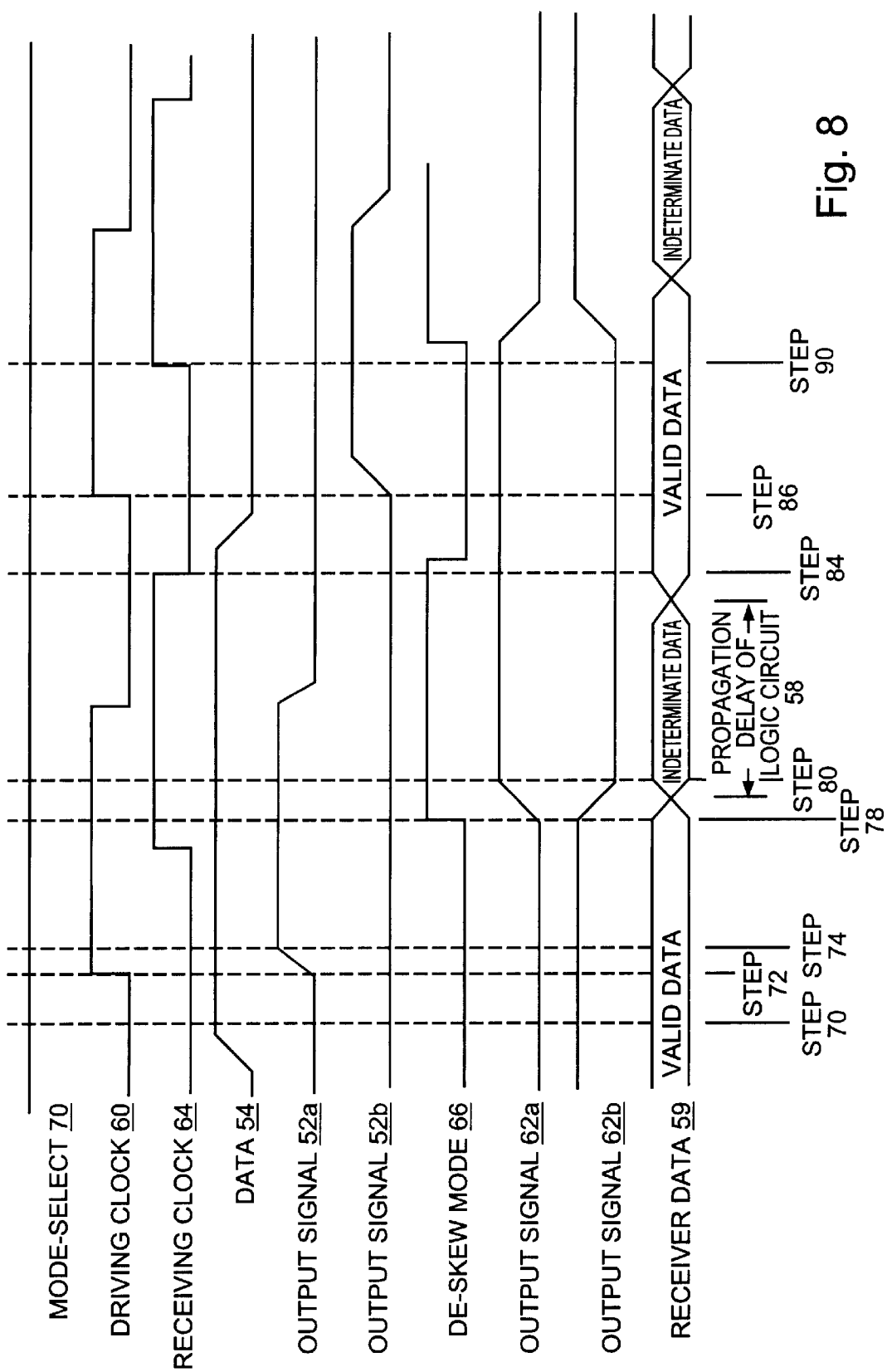
FIG. 8 is a timing diagram of the operation of the clocked circuit of FIG. 6.

Referring now to FIGS. 7 and 8, a flow diagram and a timing diagram depict the operation of clocked circuit 50 in response to mode select signal 70 being asserted. It should be noted that corresponding portions of FIGS. 7 and 8 have been correspondingly labeled. When mode select signal 70 is asserted, de-skewing circuit 62 performs a de-skewing operation between the receiving clock signal 64 and the driving clock signal 60.

For illustration purposes, consider that a logic high level is asserted on data signal 54 while driving clock signal 60 and receiving clock signal 64 are de-asserted (Step 79). Subsequently, driving clock signal 60 is asserted and sense amplifier 52 latches the logic high level, and its complement, on output signals 52a and 52b, respectively (Steps 80 and 81). Those logic levels are conveyed to the gate terminals of transistors 74, 75, 77 and 78. Responsively, transistors 74 and 77 are turned-on and transistors 75 and 78 remain turned-off (Step 82).

When the de-skew mode signal 66 is asserted in response to an assertion of receiving clock signal 64, transistors 73 and 76 are responsively turned-on (Step 83). With transistors 73 and 76 turned-on, output signal 62a is pulled-up to Vdd through transistors 76 and 77, and output signal 62b is pulled-down to Vss through transistors 73 and 74 (Step 84). Those values are retained by circularly coupled inverters 75a and 75b until the next assertion of de-skew mode signal 66 and until sense-amplifier 52 asserts new data.

The logic levels that develop on output signals 62a and 62b are conveyed to logic circuit 58 (Step 86). After the propagation time for logic circuit 58 has occurred, the data presented to receiver unit 56 becomes valid or determinate and receiving clock 64 de-asserts, disabling transistors 73 and 76. (Step 87). Subsequently, driving clock signal 60 is again asserted to generate new data, e.g., a logic low level (Step 88). The newly generated data is gated by de-skewing unit 62 such that the old data presented to receiver unit 56 remains determinate at least until receiving clock signal 64 is asserted (Step 89). When receiving clock signal 64 is asserted, receiver unit 56 latches the determinate data. Responsively, de-skew mode signal 66 is asserted and the logic levels of the new data are released from de-skewing circuit 62 when transistors 73 and 76 are turned-on (Step 90).

IV. Operation of Clocked Circuit when Clock Skew is not Present

Figure 9:
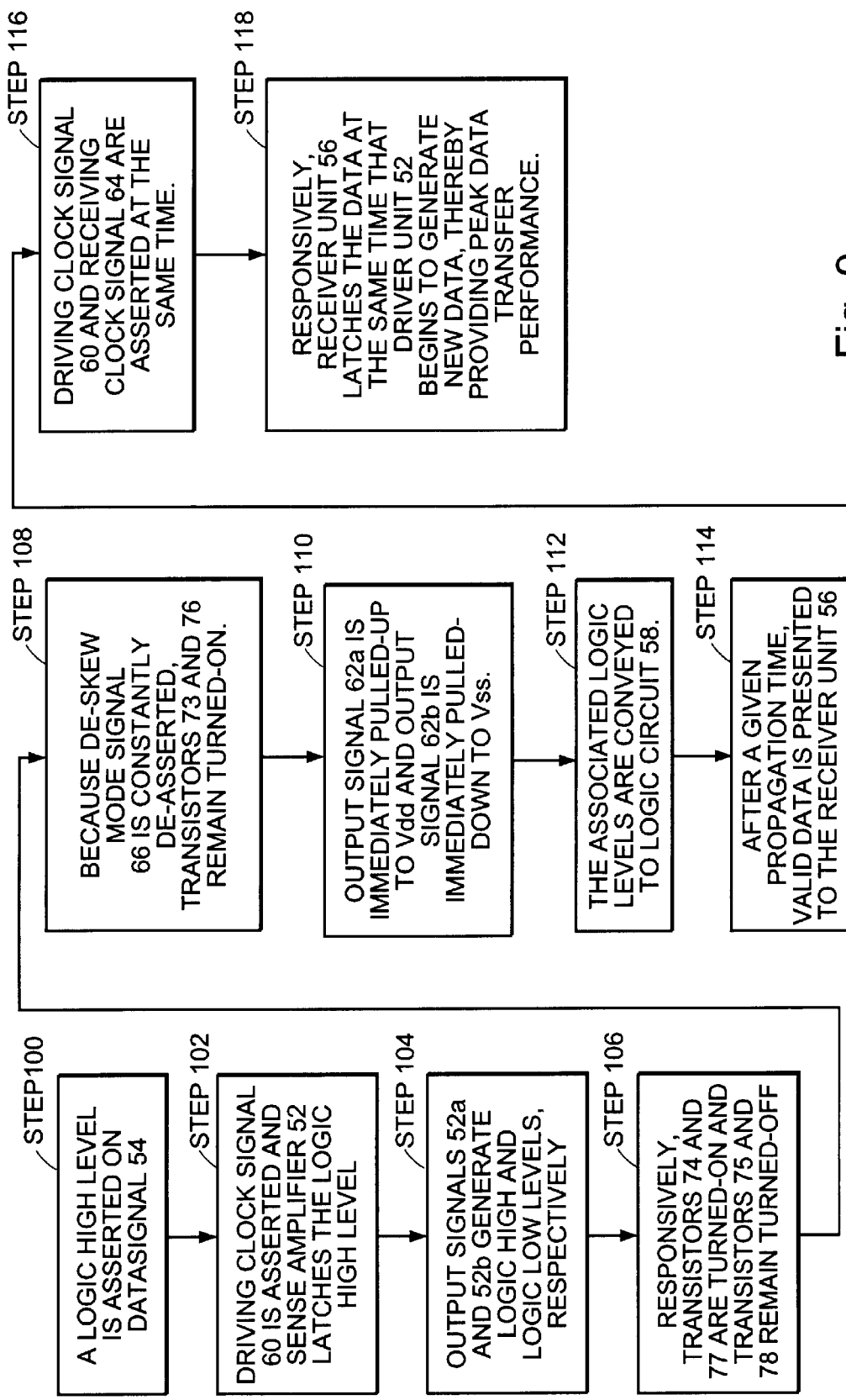
FIG. 9 is a flow diagram of a further operation of the clocked circuit of FIG. 5.
Figure 10:
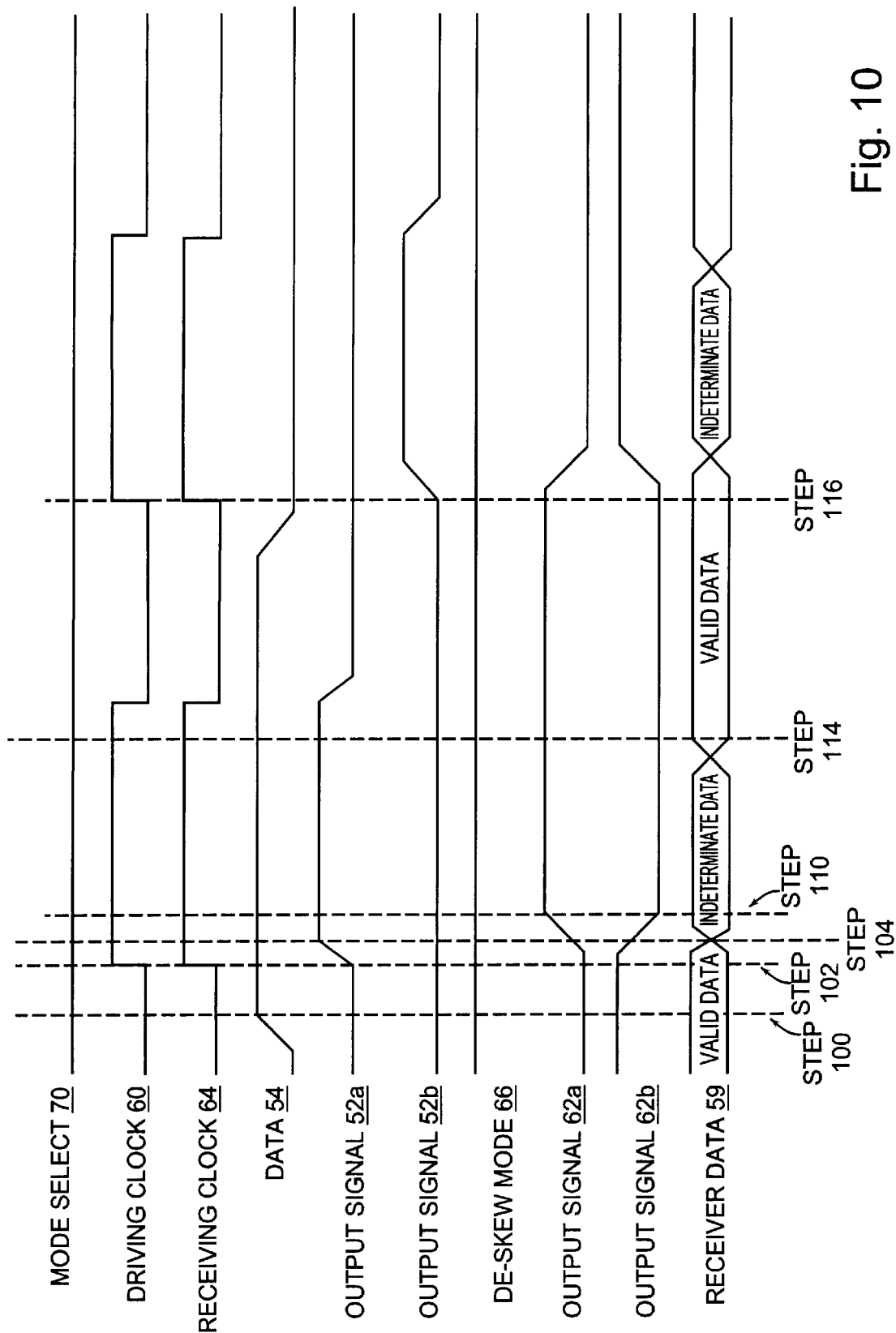
FIG. 10 is a timing diagram of the operation of the clocked circuit of FIG. 6.

Referring now to FIGS. 9 and 10, a flow diagram and timing diagram depict the operation of clocked circuit 50 when mode select signal 70 is de-asserted. When mode select signal 70 is de-asserted, de-skewing circuit 62 performs a buffering operation on the data output from driving unit 52. It should be noted that corresponding portions of FIGS. 9 and 10 have been correspondingly labeled.

For illustration purposes, again consider that a logic high level is asserted on data signal 54 (Step 100). Subsequently driving clock signal 60 is asserted and sense amplifier 52 latches the logic high level, and its complement, on output signals 52a and 52b respectively (Steps 102 and 104). Those logic levels are conveyed to the gate terminals of transistors 74, 75, 77 and 78. Responsively, transistors 74 and 77 are turned-on and transistors 75 and 78 remain turned-off (Step 106).

Because in the present illustration the de-skew mode signal 66 is de-asserted, transistors 73 and 76 remain turned-on (Step 108). With transistors 73 and 76 turned-on, output signal 62a is immediately pulled-up to Vdd through transistors 76 and 77, and output signal 62b is immediately pulled-down to Vss through transistors 73 and 74 (Step 110).

The logic levels that develop on output signals 62a and 62b are conveyed to logic circuit 58 (Step 112). After the propagation time for logic circuit 58 has occurred, the data presented to receiver unit 56 becomes valid (Step 114). Subsequently, driving clock signal 60 and receiving clock signal 64 are asserted at essentially the same time due to the fact that clock skew is not present (Step 116). When receiving clock signal 64 is asserted, receiver unit 56 latches the valid data at the same time that driver unit 52 begins to generate new data (Step 118).

Accordingly, when the de-skewing operation is not performed by de-skewing circuit 62, data generated by driver circuit 52 is not delayed but rather is conveyed to logic circuit 58 and receiver unit 56 as quickly as possible. Some delay is added to clocked circuit 50, when the de-skewing operation is not performed, because of the additional series transistors 73 and 76. Such delay is extremely minimal and is far outweighed by the benefit of being able to ensure that clocked circuit 50 will operate even in the presence of clock skew.

A further benefit of the present invention is that after clocked circuit 50 is fabricated in a semiconductor device, a test can be performed to determine whether it is functional. Upon determining that data cannot be transferred due to the presence of clock skew, the mode select signal 70 can be asserted in order that functionality is restored. Once the circuit becomes functional, testing can resume albeit at less than peak performance. Subsequently, further testing procedures can be performed to determine the functionality of other circuits within the device. Alternatively, if the semiconductor device is functional due to an absence of clock skew, the mode select signal 70 can be de-asserted and peak data transfer performance achieved.

V. Alternative Embodiments of the Present Invention

Figure 11:
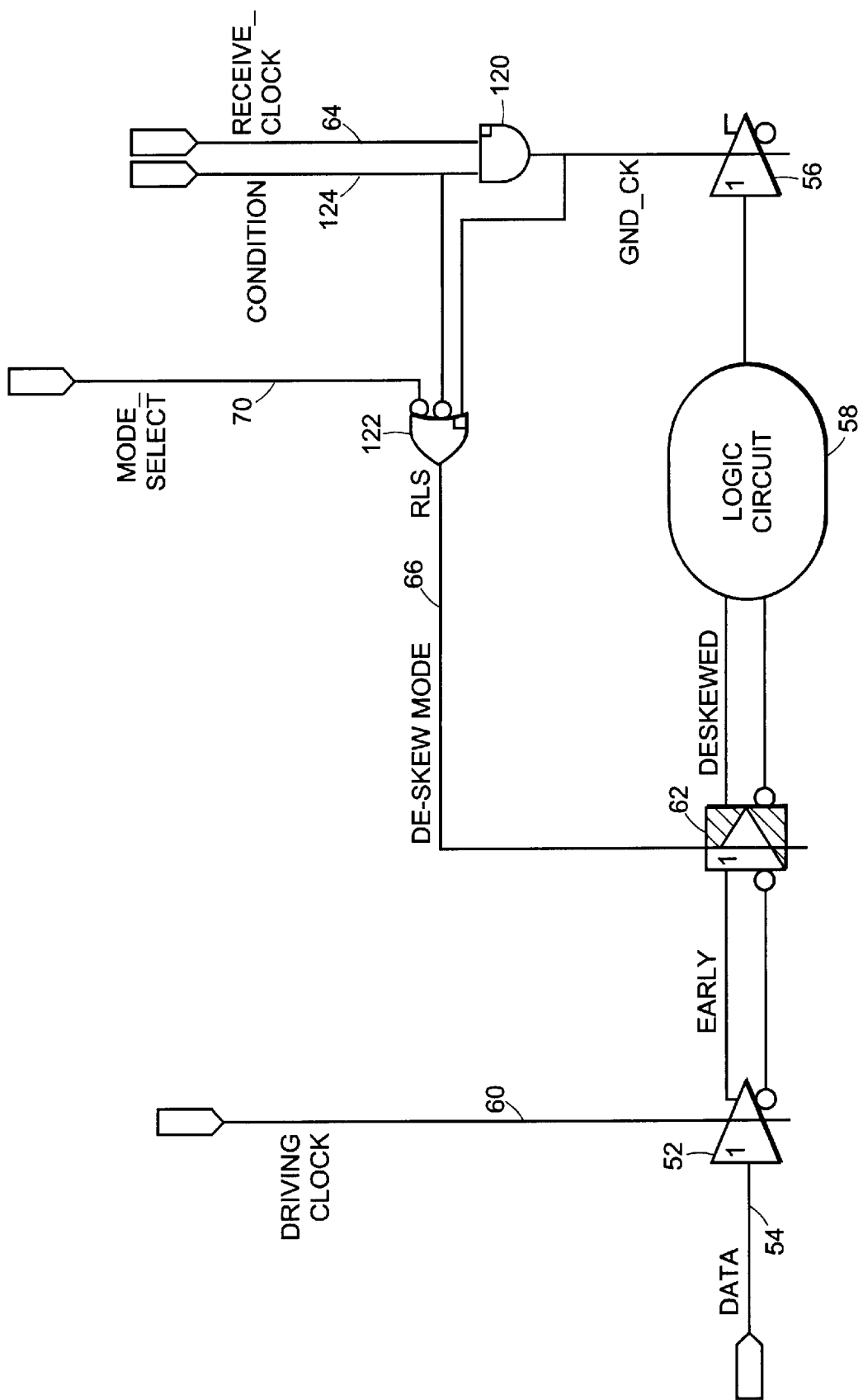
FIG. 11 is a schematic diagram of an alternative embodiment of the present invention.

Referring now to FIG. 11, an alternative embodiment of the present invention is shown to include conditional logic 120 and three-input-or gate 122. The receiving unit 56 of the present embodiment latches data when receiving clock signal 64 and condition signal 124 are asserted. It should be noted that condition signal 124 can be asserted or de-asserted in response to any desired logic function that indicates when the clocking signal should be asserted. In one typical implementation, receiving unit 56 can be turned off to reduce power consumption. Therefore, condition signal 124 would be de-asserted to indicate that receiving unit 56 cannot pass data during the present clock cycle. Condition signal 124 is also presented to three-input or gate 122 such that the de-skewing operation can only be performed when the selected condition is satisfied.

Figure 12:
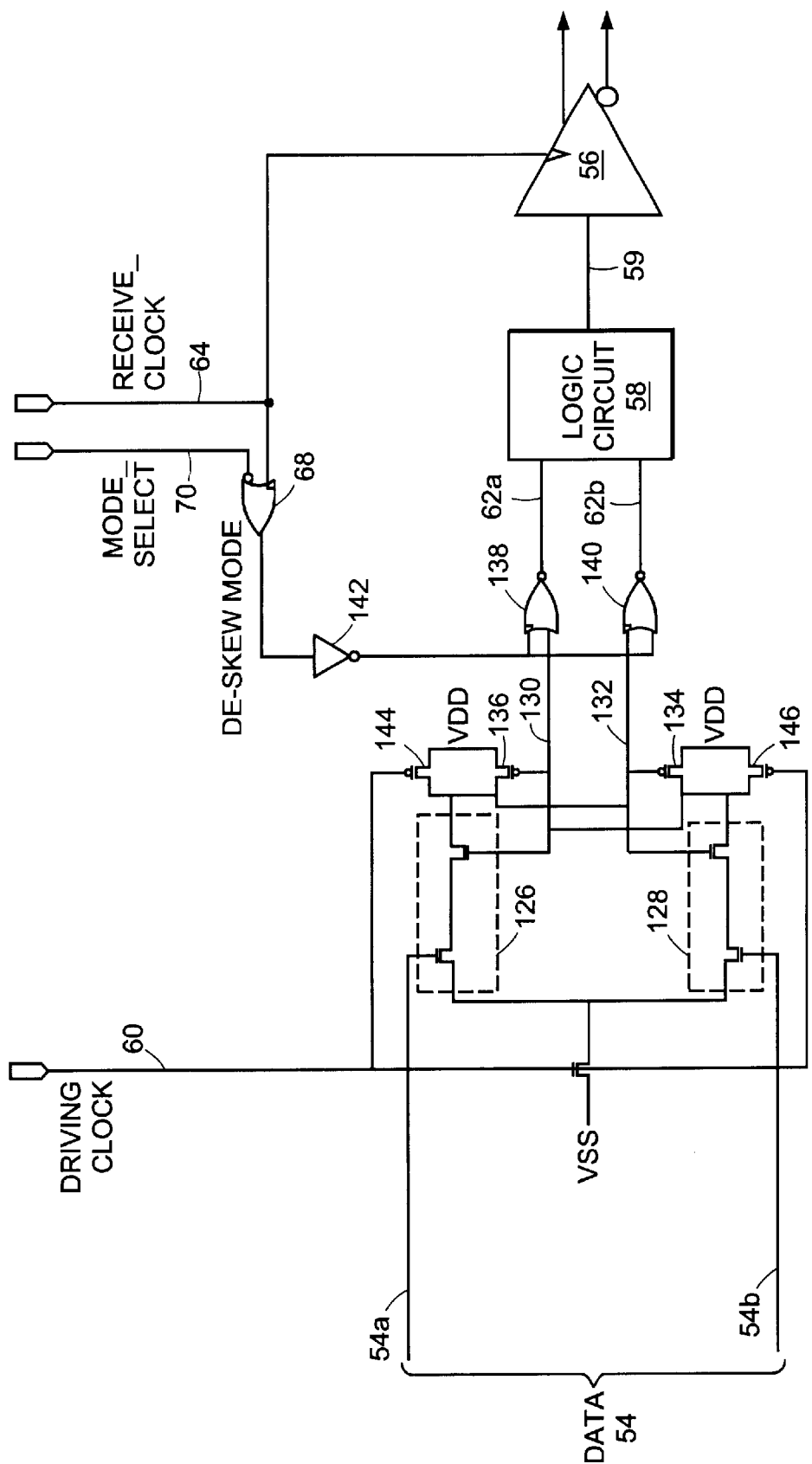
FIG. 12 is a schematic diagram of a further alternative embodiment of the present invention.

A further alternative embodiment of clocked circuit 50 is depicted in FIG. 12. A schematic diagram of that embodiment is shown to include a sense amplifier that is used to collectively implement driver unit 52 and de-skewing circuit 62. Generally, depending upon the logic level of data signals 54a and 54b (i.e., the complementary data signals that comprise data signal 54), one of the discharge paths 126 or 128 will discharge at that faster rate. Responsively, one of the associated output signals, 130 or 132, will also be discharged at that rate. The output signal 130 or 132 that discharges the quickest will turn-on PMOS transistor 134 or 136, respectively. That PMOS transistor provides a path to Vdd that pulls the other output signal to a logic high level. The faster discharging output signal is allowed to continue to discharge to Vss.

When mode-select signal 70 is asserted and receive clock 64 is deasserted, one input of nor-gates 138 and 140 receives a logic high level from the output of inverter 142. Responsively, output signals 130 and 132 are prevented from being passed through those nor-gates until receiving clock signal 64 is asserted. Once receiving clock signal 64 asserts, nor-gates 138 and 140 act as inverters, providing data signals 130 and 132 to logic circuit 58. Alternatively, when mode-select signal 70 is de-asserted, nor-gates 134 and 136 simply buffer output signals 130 and 132 in the manner previously described.

Figure 13:
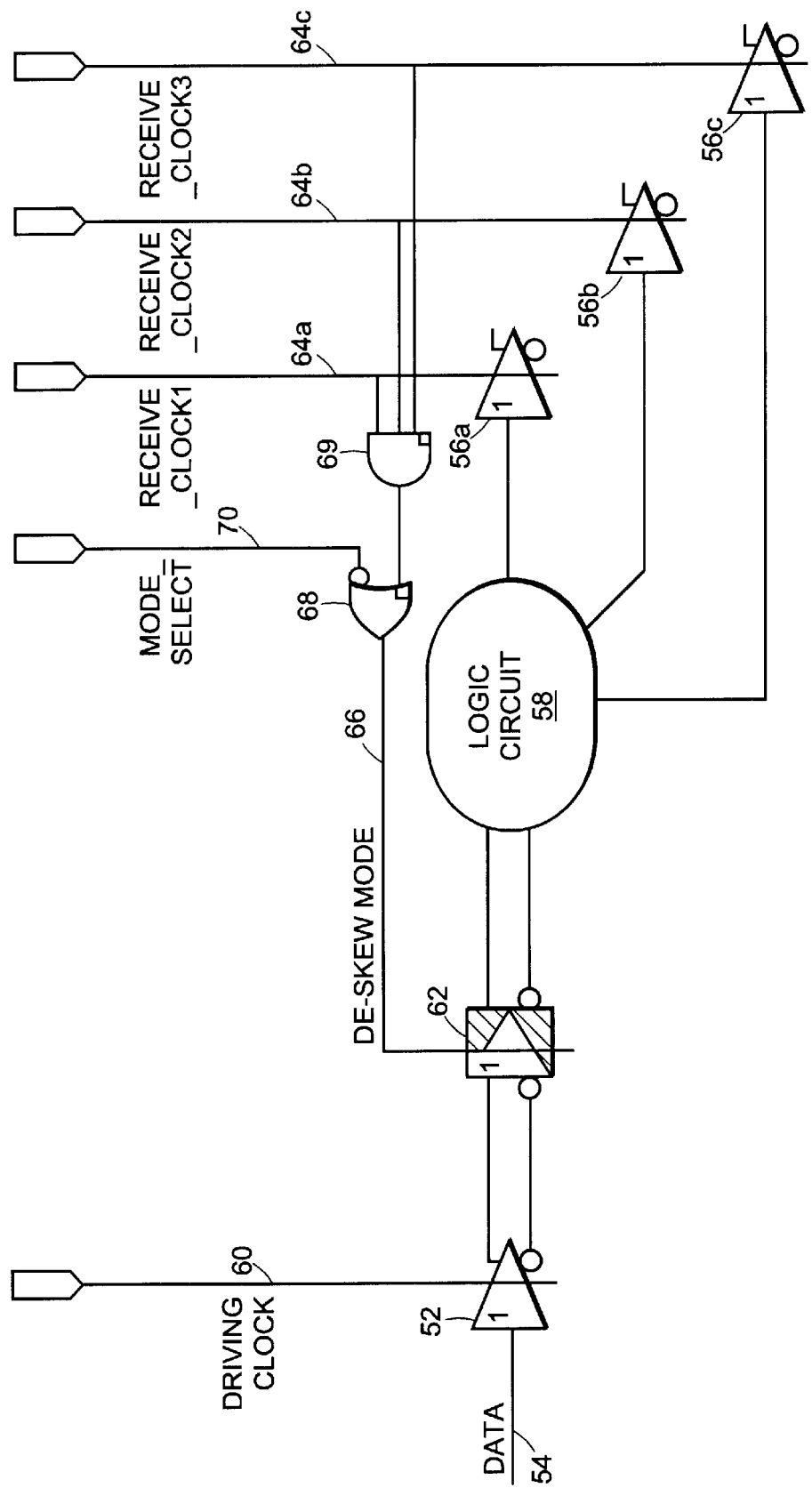
FIG. 13 is a schematic diagram of a still further alternative embodiment of the present invention.

Referring now to FIG. 13, clocked circuit 50 is shown to include a multiple number of receiver units 56a–56c. When mode_select signal 70 is asserted, de-skewing circuit 62 gates the output of driver unit 52 until each of the receiving clock signals 64a–64c have asserted. With such a structure, the data presented to each of the receiving units 56a–56c is guaranteed to remain valid at least until each of those receiving units have latched the data.

It should be noted that the present invention can implement the driving unit 52 and/or the receiving unit 56 using the sense amplifier described in co-pending Application "A High Input Impedance Strobed CMOS Differential Sense Amplifier With Pre-Evaluate Charge Sharing on Complementary Nodes", invented by Daniel W. Bailey (Ser. No. 09/241,243 filed on Feb. 1, 1999). With such a structure, significantly increased performance due to a considerable reduction of the sense amplifier's data hold timing requirement is provided.

It should be further noted that the present invention can implement the driving unit 52 and/or the receiving unit 56 using the sense amplifier described in co-pending Application "A High Input Impedance Strobed CMOS Differential Sense Amplifier With Double Fire Evaluate", invented by Jeff L. Chu, Daniel W. Bailey, and Jason Cantin (Ser. No. 09/241,003 filed on Feb. 1, 1999). With such a structure, the sensitivity of the sense amplifier is increased due to an improved common mode rejection ratio.

It should also be noted that the present invention can implement the driving unit 52 and/or the receiving unit 56 using the sense amplifier described in co-pending Application "Pass-Gate Inputs That Temporarily Hold State On A High Input Impedance Strobed CMOS Differential Sense Amplifier", invented by Daniel W. Bailey (Ser. No. 09/241,000 filed on Feb. 1, 1999). With such a structure, a significant reduction of the data hold timing requirement is provided.

It should further be noted that driving unit 52 and/or receiving unit 56 can be implemented with either an edge triggered sense amplifier or other type of flip-flop device, or a level sensitive latch.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An apparatus for ensuring functionality of a clocked circuit without limiting peak performance, comprising:
    a de-skewing device, coupled to a data signal that is generated by a driver device at a time that is indicated by an assertion of a first clock signal, said de-skewing device for buffering said data signal in response to a de-assertion of a mode select signal and for gating said data signal in response to an assertion of said mode select signal until a second clock signal is asserted; and
    a receiver device for receiving said data signal from said driver device via said de-skewing device, said receiver device latching said data signal in response to said assertion of said second clock signal, said receiver device being ensured of latching valid data from said data signal when said mode select signal is asserted, said mode select signal being asserted when a clock skew is detected between said first and second clock signals.

2. The apparatus for ensuring functionality of said clocked circuit, as described in claim 1, further comprising:
    a first clock circuit for generating said first clock signal; and
    a second clock circuit for generating said second clock signal, wherein said clock skew is a difference between when said first clock circuit asserts said first clock signal and when said second clock circuit asserts said second clock signal.

3. The apparatus for ensuring functionality of said clocked circuit, as described in claim 2, wherein said driver device and said receiver device are edge triggered sense amplifiers.

4. The apparatus for ensuring functionality of said clocked circuit, as described in claim 3, further comprising:
    a logic circuit for performing a logic function between said second clock signal and said mode select signal such that said de-skew device performs a buffer operation when said mode select signal is de-asserted.

5. The apparatus for ensuring functionality of said clocked circuit as described in claim 4 wherein the logic circuit is a logical-or circuit.

6. The apparatus for ensuring functionality of said clocked circuit as described in claim 4 wherein the logic circuit is a logical-and circuit.

7. The apparatus for ensuring functionality of said clocked circuit, as described in claim 4, wherein said de-skewing device performs a de-skewing operation when said mode select signal is asserted, said de-skewing operation being said gating of said data signal until said assertion of said second clock signal.

8. The apparatus for ensuring functionality of said clocked circuit, as described in claim 7, wherein said mode select signal is de-asserted to allow said clocked circuit to operate at peak performance.

9. The apparatus for ensuring functionality of said clocked circuit, as described in claim 8, wherein said de-skewing device and said logic circuit remain coupled to the clocked circuit in a production version of said clocked circuit without limiting peak performance of that clocked circuit.

10. The apparatus for ensuring functionality of said clocked circuit, as described in claim 1, wherein a logic circuit performs a logic function on a data signal output from said de-skewing device before said data signal is conveyed to said receiver device.

11. An apparatus for ensuring functionality of a clocked circuit without limiting peak performance, comprising:
    means for determining whether said clocked circuit will not function due to clock skew between a first clock signal clocking a first portion of said circuit and a second clock signal clocking a second portion of said circuit;
    means for asserting a mode select signal in response to a determination that said clocked circuit will not function due to said clock skew;
    means for performing a logic function on said second clock signal and said mode select signal to indicate an assertion of said second clock signal when said mode select signal is asserted; and
    means for gating data, generated by said first portion of said clocked circuit, with an output of said logic function such that the said data remains stable until said output of said logic function indicates that said second clock signal has asserted.

12. The apparatus for ensuring functionality of said clocked circuit, as described in claim 11, further comprising:
    means for generating said first clock signal;
    means for generating said second clock signal; and
    means for de-asserting said mode select signal in response to a determination that said clock circuit is functional due to an absence of said clock skew such that said clocked circuit operates at peak performance.

13. The apparatus for ensuring functionality of said clocked circuit, as described in claim 12, wherein said output of said logic function clocks a de-skewing unit that receives said data from said first portion of said clocked circuit and that outputs said data in response to said output of said logic function.

14. The apparatus for ensuring functionality of said clocked circuit, as described in claim 13, wherein said de-skewing unit is an edge triggered sense amplifier.

15. The apparatus for ensuring functionality of said clocked circuit, as described in claim 13, wherein said de-skewing unit is a flip-flop device.

16. A computer system, comprising:
    a central processing unit coupled to a system bus;
    a main memory coupled to said central processing unit by said system bus;

an I/O driver device coupled to said central processing unit by said system bus; and a clocked circuit, included in said central processing unit, including a de-skewing device that can alternatively perform a de-skewing operation or a buffer operation such that said clocked circuit is ensured of being able to function in the presence of clock skew.

17. The computer system described in claim 16 wherein said clocked circuit further comprises:

a driver device, for generating a data signal at a time that is indicated by an assertion of a first clock signal;

said de-skewing device, coupled to said data signal, for immediately outputting said data signal in response to a de-assertion of a mode select signal and for outputting said data signal upon an assertion of a second clock signal in response to an assertion of said mode select signal;

a receiver device for receiving said data signal from said de-skewing device, said receiver device latching said data signal in response to said assertion of said second clock signal, said receiver device being ensured of latching valid data from said data signal when said mode select signal is asserted; and said mode select signal being asserted when a clock skew is detected between said first and second clock signals.

18. The computer system described in claim 17, wherein said clocked circuit further comprises:

a first clock circuit for generating said first clock signal; and a second clock circuit for generating said second clock signal, said clock skew being a difference between when said first clock circuit asserts said first clock signal and when said second clock circuit asserts said second clock signal.

19. The computer system described in claim 17, wherein said driver device and said receiver device are edge triggered sense amplifiers.

20. The computer system described in claim 17, wherein said clocked circuit further comprises:

a logic circuit for performing a logic function between said second clock signal and said mode select signal such that said de-skewing device performs a buffer operation when said mode select signal is de-asserted.

21. The computer system described in claim 20 wherein the logic circuit is a logical-or circuit.

22. The computer system described in claim 20 wherein the logic circuit is a logical-and circuit.

23. The computer system described in claim 20, wherein said de-skewing device performs a de-skewing operation when said mode select signal is asserted, said de-skewing operation being said outputting of said data signal in response to said assertion of said mode select signal.

24. The computer system described in claim 23, wherein said mode select signal is de-asserted to allow said clocked circuit to operate at peak performance.

25. The computer system described in claim 24 wherein said de-skewing device and said logic circuit remain coupled to the clocked circuit in a production version of said clocked circuit without limiting peak performance of that clocked circuit.

26. The computer system described in claim 25, wherein a logic circuit performs a logic function on a data signal output from said de-skewing device before said data signal is conveyed to said receiver device.

27. A method for ensuring functionality of a clocked circuit without limiting peak performance, comprising the steps of:

determining whether said clocked circuit will not function due to clock skew between a first clock signal clocking a first portion of said circuit and a second clock signal clocking a second portion of said circuit;

asserting a mode select signal in response to a determination that said clocked circuit will not function due to said clock skew;

performing a logic function on said second clock signal and said mode select signal to indicate an assertion of said second clock signal when said mode select signal is asserted;

gating data generated by said first portion of said clocked circuit with an output of said logic function such that said data remains stable until said output of said logic function indicates that said second clock signal has asserted;

de-asserting said mode select signal in response to a determination that said clock skew is not present in said clocked circuit; and buffering data, generated by a driver portion of said clocked signal, in response to said de-assertion of said mode select signal.

28. The method for ensuring functionality of said clocked circuit, as described in claim 27, wherein said output of said logic function clocks a de-skewing unit that receives said data from said first portion of said clocked circuit and that outputs that data in response to said output of said logic function.

29. The method for ensuring functionality of said clocked circuit, as described in claim 28, wherein said de-skewing unit is an edge triggered sense amplifier.

30. The method for ensuring functionality of said clocked circuit, as described in claim 28, wherein said de-skewing unit is a flip-flop device.

31. The method for ensuring functionality of said clocked circuit, as described in claim 28, wherein said second portion of said clocked circuit comprises a logic function that is imposed on said data that is output by said de-skewing unit and a latch for latching the output of that logic function.

32. The method for ensuring functionality of said clocked circuit, as described in claim 31 wherein said latch comprises an edge triggered sense amplifier.

* * * * *